United States Patent
Schaible et al.

(10) Patent No.: US 9,735,529 B2
(45) Date of Patent: Aug. 15, 2017

(54) PLUG-IN MODULE FOR A MOTOR UNIT

(71) Applicant: Conti Temic microelectronic GmbH, Nürnberg (DE)

(72) Inventors: Martin Schaible, Singen (DE); Andreas Glemser, Überlingen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 15/104,087

(22) PCT Filed: Dec. 16, 2014

(86) PCT No.: PCT/EP2014/078059
§ 371 (c)(1),
(2) Date: Jun. 13, 2016

(87) PCT Pub. No.: WO2015/091546
PCT Pub. Date: Jun. 25, 2015

(65) Prior Publication Data
US 2016/0315437 A1 Oct. 27, 2016

(30) Foreign Application Priority Data
Dec. 17, 2013 (DE) .................. 10 2013 226 205

(51) Int. Cl.
*H01R 31/06* (2006.01)
*H01R 13/41* (2006.01)
(Continued)

(52) U.S. Cl.
CPC .......... *H01R 31/065* (2013.01); *H01R 13/41* (2013.01); *H01R 27/02* (2013.01); *H02K 5/225* (2013.01);
(Continued)

(58) Field of Classification Search
CPC .... H01R 12/724; H01R 13/41; H01R 13/112; H01R 13/6315; H01R 25/145; H01R 27/02; H01R 31/065; H02K 5/225; H02K 11/30
(Continued)

(56) References Cited

U.S. PATENT DOCUMENTS 4,275,944 A * 6/1981 Sochor .................. H01R 12/89
439/267
5,100,338 A * 3/1992 Lu ......................... H01R 12/57
439/326
(Continued)

FOREIGN PATENT DOCUMENTS

DE 20004338 7/2001
EP 0996213 4/2000
WO 2007012925 2/2007

OTHER PUBLICATIONS

International Search Report and Written Opinion of the International Searching Authority for International Application No. PCT/EP2014/078059 mailed Feb. 23, 2015.

*Primary Examiner* — Tho D Ta
*Assistant Examiner* — Travis Chambers
(74) *Attorney, Agent, or Firm* — RatnerPrestia

(57) ABSTRACT

A plug-in module for a motor unit, in particular for an adjusting motor, the plug-in module having a plug for introducing into a housing of the motor unit. In addition, the plug has: a carrier element having at least one recess for a respective electrical plug element; and the plug element itself for engaging with the corresponding plug connector of the motor unit, the plug element being arranged into the recess. Furthermore, the recess includes: an opening via which a plug element can be introduced in the recess; and a holding section into which a securing zone of the plug element can be pressed.

14 Claims, 7 Drawing Sheets

(51) Int. Cl.
*H02K 5/22* (2006.01)
*H02K 11/30* (2016.01)
*H01R 27/02* (2006.01)
*H01R 12/72* (2011.01)
*H01R 13/11* (2006.01)
*H01R 13/631* (2006.01)

(52) U.S. Cl.
CPC ............ *H02K 11/30* (2016.01); *H01R 12/724* (2013.01); *H01R 13/112* (2013.01); *H01R 13/6315* (2013.01)

(58) Field of Classification Search
USPC .............. 439/639, 76.1, 76.2, 246, 249, 251
IPC ............................................ H02K 5/225, 11/30
See application file for complete search history.

(56) References Cited

U.S. PATENT DOCUMENTS

| | | | |
|---|---|---|---|
| 6,249,068 B1* | 6/2001 | Knopp | H02K 5/225 310/67 R |
| 6,317,332 B1* | 11/2001 | Weber | B60R 16/0239 310/71 |
| 6,325,633 B1* | 12/2001 | Ito | H01R 13/187 439/246 |
| 6,530,793 B2* | 3/2003 | Eichhorn | H01R 29/00 439/218 |
| 6,530,796 B2* | 3/2003 | Bentz | H02K 5/225 439/248 |
| 6,558,198 B2* | 5/2003 | Kobayashi | H01H 85/0417 337/290 |
| 6,648,696 B2* | 11/2003 | Zemanik | H01R 13/4223 439/682 |
| 6,855,013 B2* | 2/2005 | Chiang | H01R 12/7076 439/736 |
| 7,114,962 B1* | 10/2006 | Takahashi | B60Q 1/1469 439/76.1 |
| 7,758,385 B2* | 7/2010 | Davis | H01R 23/688 439/626 |
| 7,905,732 B2* | 3/2011 | Chung | H01H 85/2035 439/620.27 |
| 2004/0235328 A1* | 11/2004 | Maegawa | H01R 43/24 439/246 |

* cited by examiner

PLUG-IN MODULE FOR A MOTOR UNIT

CROSS REFERENCE TO RELATED APPLICATIONS

This application is the U.S. National Phase Application of PCT International Application No. PCT/EP2014/078059, filed Dec. 16, 2014, which claims priority to German Patent Application No. 10 2013 226 205.1, filed Dec. 17, 2013, the contents of such applications being incorporated by reference herein.

FIELD OF THE INVENTION

The present invention relates to a plug-in module for a motor unit, in particular for an adjusting motor in a motor vehicle. An adjusting motor of this kind is used, for example, to move windows, doors, flaps or soft tops, generally speaking for elements that close openings of the passenger compartment.

BACKGROUND OF THE INVENTION

Modern motor vehicles nowadays have devices, actuated by external force or driven by motor, for moving (opening or closing) windows. Such devices comprise a motor unit as adjusting motor, which are provided in a motor vehicle door by means of a transmission mechanism and corresponding cables for moving the window. The assembly process in motor vehicles generally requires a modular configuration of the individual components, as in a window lifter. One module is formed by the motor unit which, within a housing, can have both an electric motor and also a corresponding transmission, wherein a second module, which can be designed as a plug-in module, can be connected to the module of the motor unit in order to provide current and to control the electric motor. To supply the motor with electrical energy or with electrical current, electrical contact elements are arranged in the housing or module of the motor unit and, when the plug-in module is inserted, they have to be electrically connected to corresponding motor contacts or electrical plug elements of the plug-in module. To achieve a low weight and to realize a predetermined shape for the plug-in module, the latter, or a housing thereof, is generally produced from a plastic. However, there is then the problem that the motor contacts or the electrical plug elements for contacting the electrical contact elements of the motor unit have to be arranged correctly and securely in the plastic structure of the plug-in module.

SUMMARY OF THE INVENTION

An aspect of the present invention is a simple and cost-effective possibility of creating a plug-in module with corresponding plug elements, which are provided for contacting electrical contacts of a motor unit.

According to a first aspect of the invention, a plug-in module of a motor unit is created, in particular for an adjusting motor of a motor vehicle. The plug-in module has a plug or a plug portion which can be inserted in a housing of the motor unit along a mounting direction. The plug has a carrier element which comprises at least one recess for a respective electrical plug element, and a respective electrical plug element itself for engagement with a corresponding plug connector of the motor unit (along the mounting direction) for electrical contacting. The respective plug element is arranged in the at least one recess. This at least one recess is configured in such a way that it comprises an opening through which the respective electrical plug element can be introduced into the recess, and a holding portion into which a fixing zone of the respective electrical plug connector can be pressed. In this way, it is possible that the plug-in module or more precisely the carrier element thereof can be produced from plastic, for example by means of injection molding, wherein, after production of the plastic mold, a respective electrical plug element can be easily introduced into a corresponding recess of the carrier element. It is of course also conceivable that other materials can be used for the carrier element, the plug or the plug-in module. By virtue of the separate formation of the plug-in module with carrier element, on the one hand, and of the electrical plug element, on the other hand, a cost-effective production of the individual components is thus possible, which components then only have to be joined together, which can be done with low outlay in terms of equipment. However, such construction can also be performed with less procedural outlay than if the electrical plug elements had to be encapsulated, for example, in a difficult and therefore costly encapsulation process, even partially in the carrier element or the plug or the plug-in module.

According to one embodiment of the plug-in module, the carrier element has a guide portion for guiding the plug during the insertion of the plug into the housing of the motor unit. In this way, the carrier element performs several functions, on the one hand holding or fixing one or more electrical plug elements and, on the other hand, guiding the plug during assembly.

According to a further embodiment of the plug-in module, the opening of the at least one recess is formed in a direction perpendicular to the mounting direction, such that a respective electrical plug element can be inserted into the corresponding recess in a manner perpendicular to the mounting direction. In this way, a simple and automated assembly of the plug-in module is achieved.

According to a further embodiment, the electrical plug element has a contact portion for engagement with the corresponding plug connector of the motor unit. The contact portion is movable or pivotable in a direction perpendicular to the mounting direction, in order to permit a positional orientation with respect to the plug connector of the motor unit. In particular, this mobility of the contact portion in a direction perpendicular to the mounting direction makes it easier to produce the plug connection, since the possibility of adapting the position of the contact portion means that production-related alignment errors can be compensated and, consequently, it is ensured that the electrical plug element is brought into correct and destruction-free engagement with a corresponding motor-side plug connector.

According to one embodiment, the contact portion of the electrical plug element is received at least partially in the recess in such a way that the movement of the contact portion for the positional orientation is guided by inner walls of the recess. To put it another way, the contact portion can be arranged in the recess in such a way that it is movable or pivotable in a first direction perpendicular to the mounting direction, whereas, in a second direction perpendicular to the mounting direction and perpendicular to the first direction of movement, it is located in direct proximity to inner walls of the recess, such that these permit guiding of a first direction of movement.

It is possible that the distance between the inner walls or inner side walls of the recess in the area of the contact portion corresponds substantially to the width of the electrical plug element in the area of the contact portion. In this way, exact guiding of the electrical plug element inside the recess is provided, such that, by means of this guiding, the electrical plug element acquires a certain stiffness, in particular in the mounting direction, and, when it meets the plug connector of the motor unit, it has a certain stability and is not deformed. Reliable joining together is thus enabled even in the case of a misalignment of the contact portion and of the plug connector of the motor unit.

According to a further embodiment, the contact portion of the electrical plug element has, at the ends, two opposite spring webs which are separated from each other by a slit, in particular an elongate slit, so as to engage with a corresponding comb-like or leaf-like plug connector of the motor unit. The recess can surround the contact portion in such a way that the recess, in the area of the (elongate) slit, has at least one corresponding recess-side (elongate) slit, which allows the comb-like plug connector of the motor unit to engage in the mounting direction with the slit of the contact portion. By designing the contact portion in the form of the spring webs separated by a slit, and otherwise by providing a corresponding slit in the recess, the electrical plug element firstly acquires good guiding and thus good stability, and the recess-side slit ensures secure mounting of the motor-unit-side plug connector in the contact portion of the electrical plug element.

According to one embodiment, the recess-side slit has, at its free end, or at the portion surrounding the free end of the electrical plug element, a funnel-shaped portion for guiding the comb-like plug connector of the motor unit. This means that, by virtue of this funnel-shaped portion of the recess-side slit, the plug connector of the motor unit already experiences a first positioning, such that an alignment error can thus already be minimized to a certain extent, wherein, for example, through the possibility of the contact portion executing a movement perpendicular to the mounting direction, a further possibility is created for compensation of alignment errors.

According to a further embodiment of the carrier element, the latter has two recesses for receiving a respective electrical plug element, wherein the respective openings of the two recesses are oriented perpendicular to the mounting direction and in respectively opposite directions. This again ensures an improved and simplified process of assembly of the plug-in module in order, in particular, to ensure a supply of power to the motor unit by means of two electrical plug elements.

According to a further aspect of the invention, a method is made available for producing or assembling a plug-in module for a motor unit, in particular for an adjusting motor for a motor vehicle. In particular, a plug-in module according to the above description can be produced thereby. According to a first method step, plastic is used to cast a plug housing for insertion into a housing of a motor unit, in particular by injection molding, wherein the plug element has a carrier element which comprises at least one recess for a respective electrical plug element for engagement with a corresponding plug connector of the motor unit. The at least one recess has an opening through which a respective electrical plug element can be introduced into the recess, and a holding portion into which a respective electrical plug element can be pressed by means of its fixing zone. In a second method step, a respective electrical plug element on a fixing zone is pressed into the holding portion of the at least one recess. In this way, the plug housing, on the one hand, and the electrical plug element, on the other hand, can be produced in simple, separate steps, wherein the two components are simply fixed to each other by a technically simple pressing operation. By pressing in the electrical plug connector, a durable and stable connection is produced between the components.

Embodiments of the plug-in module, insofar as they are applicable to the method for producing the plug-in module, are advantageously to be regarded also as advantageous embodiments of the method for producing the plug-in module, and vice versa.

BRIEF DESCRIPTION OF THE DRAWINGS

Illustrative embodiments of the present invention will now be explained in more detail below with reference to the attached drawings, in which.

DETAILED DESCRIPTION OF THE PREFERRED EMBODIMENTS

Figure 1A:
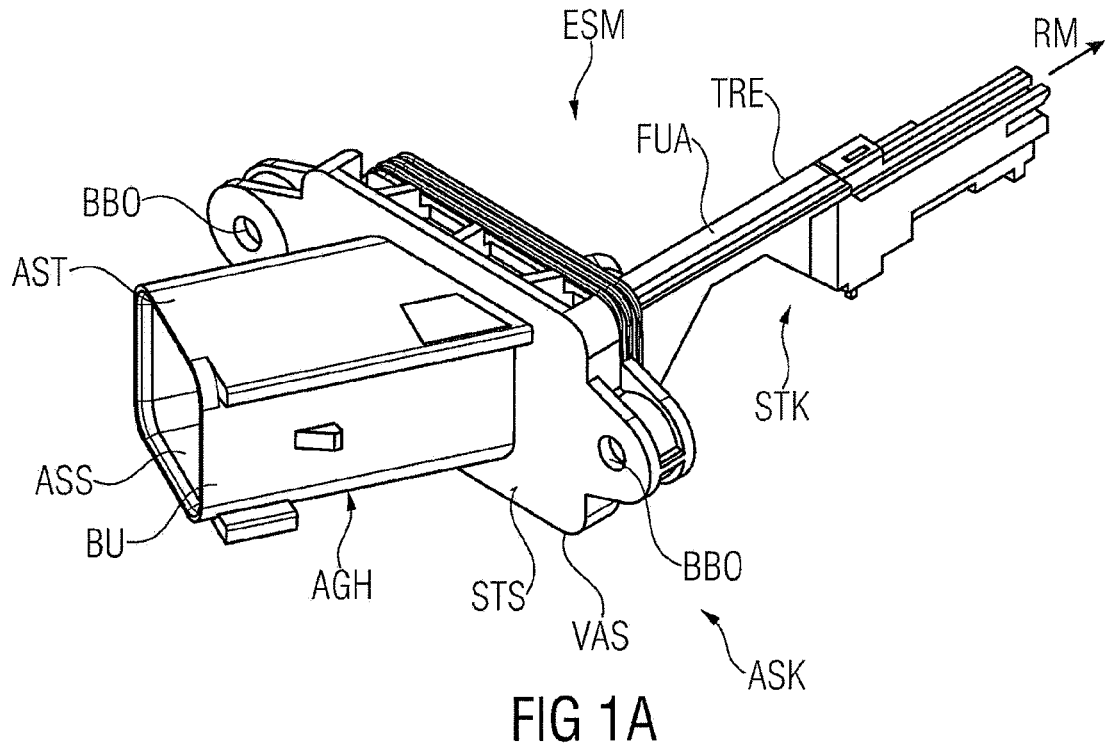
FIGS. 1A-1B show perspective views of a plug-in module according to one embodiment of the invention, from above and behind and from the front, respectively.
Figure 1B:
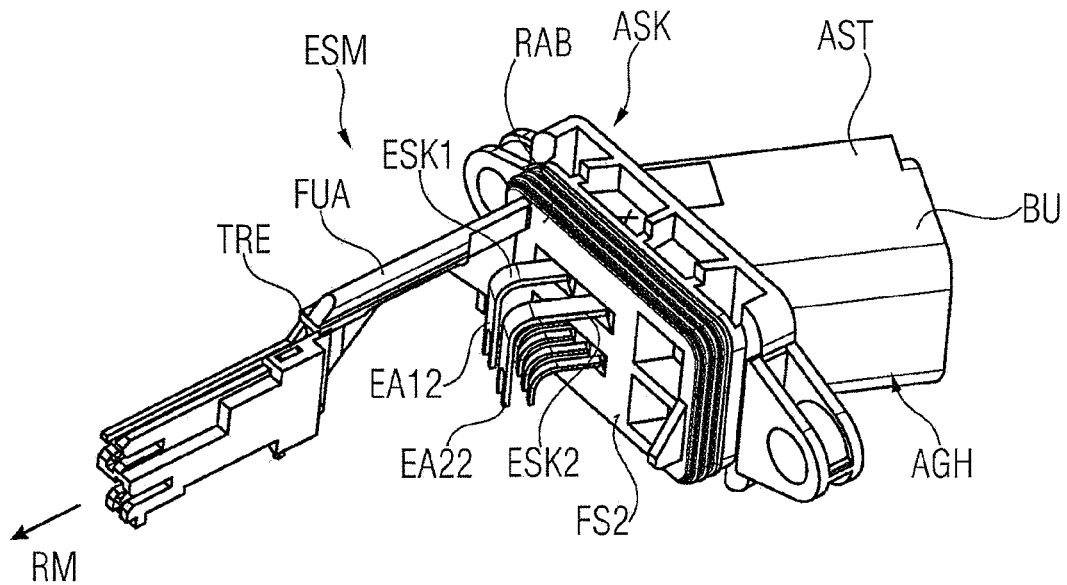

Reference is made in the first instance to FIGS. 1A-1B, in which a perspective view of a plug-in module ESM according to one embodiment of the invention is shown in a perspective view seen from above. More precisely, FIG. 1A shows the plug-in module ESM substantially from above and behind (focusing on an attachment body ASK or attachment piece AST), while FIG. 1B shows the plug-in module ESM from above and in front (focusing on a plug STK or a carrier element TRE thereof).

As will be explained in more detail with reference to FIG. 9, the plug-in module ESM is a component which is plugged into a housing MGH of a motor unit ME in order to supply the motor with electrical energy or electrical current. In particular, adjusting motors of this kind are used to move windows, doors, flaps or soft tops, generally speaking for closure elements of openings of the passenger compartment.

As main components, the plug-in module comprises a plug STK, which is connected to an attachment body ASK. More precisely, a carrier element TRE of the plug and an attachment body housing AGH of the attachment body ASK are produced from a plastic (preferably injection molded, and preferably formed in one piece). The production of a one-piece component made of plastic by injection molding is cost-effective and is associated with low outlay in terms of procedural technology.

The attachment body housing AGH has, as central part, a plate-shaped receiver or a plate-shaped connection portion VAS, on which fastening bores BBO are formed for fixing the plug-in module ESM in the motor housing MGH (cf. FIG. 9), preferably a gear housing of the motor.

On a front face STS of the connection portion VAS, an attachment piece AST with a substantially rectangular cross section protrudes at a predetermined angle, which cross section has at its free end a peripheral thin-walled collar BU. This collar BU surrounds an attachment well ASS in which exposed first end portions EA11, EA21 (cf. FIG. 7) protrude from electrical contact pins ESK1, ESK2 (and further contact pins) arranged in the attachment piece AST or attachment body ASK. These first end portions EA11, EA21 are provided for contacting with an attachment plug (not shown) which is inserted into the attachment well ASS and which, guided by the collar BU, experiences a precise positional assignment to the first end portions EA11 and EA21. The attachment plug can be connected to a cable tree in the vehicle or can originate therefrom. On the one hand, electrical energy or electrical current for operating the motor can be transmitted through this attachment plug, and also control signals for adjusting the speed of movement or direction of movement of the motor.

Figure 8:
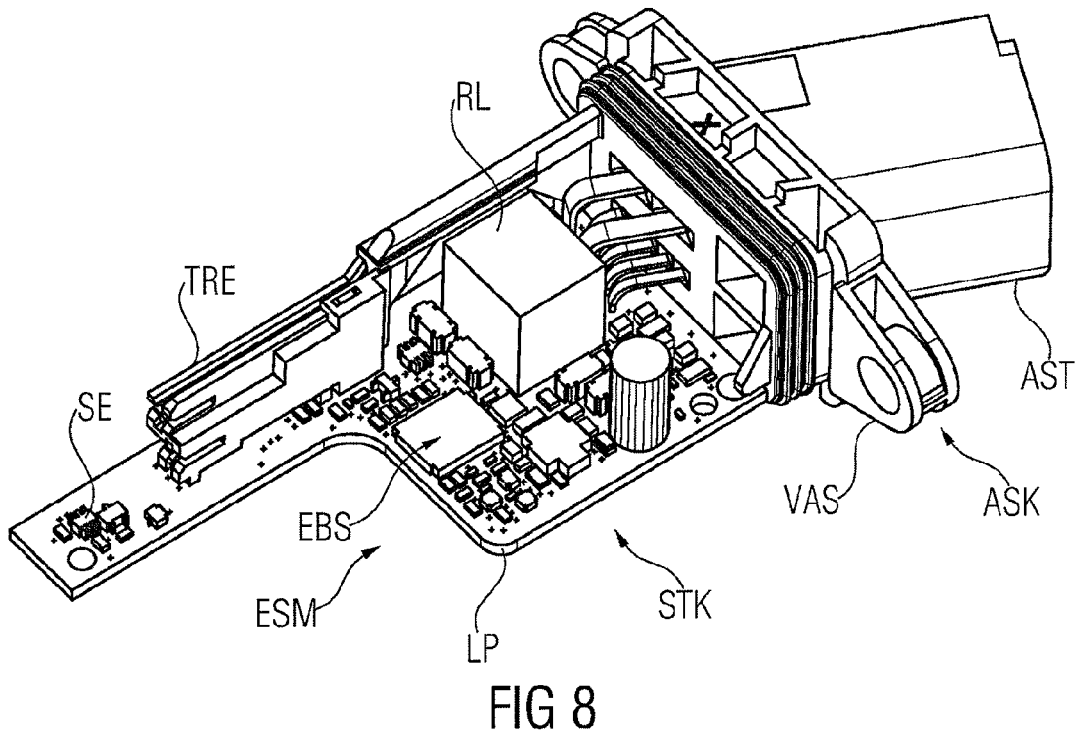
FIG. 8 shows a view of the plug-in module with connected printed circuit board.

On a front face or second side face FS2 of the connection portion VAS, second end portions EA12 and EA22 of the electrical contact pins ESK1, ESK2 and further contact pins protrude and are lead in angled form into contact bores of a printed circuit board LP and contacted therein by cohesive bonding (for example soldering), as is shown in FIG. 8. The printed circuit board LP itself is mounted (in a manner not shown in detail) in the connection portion VAS and protrudes vertically from the second surface or side face FS2. The printed circuit board LP thus performs a holding or supporting function for electronic components EBS, for example a relay RL or a sensor SE.

Figure 3:
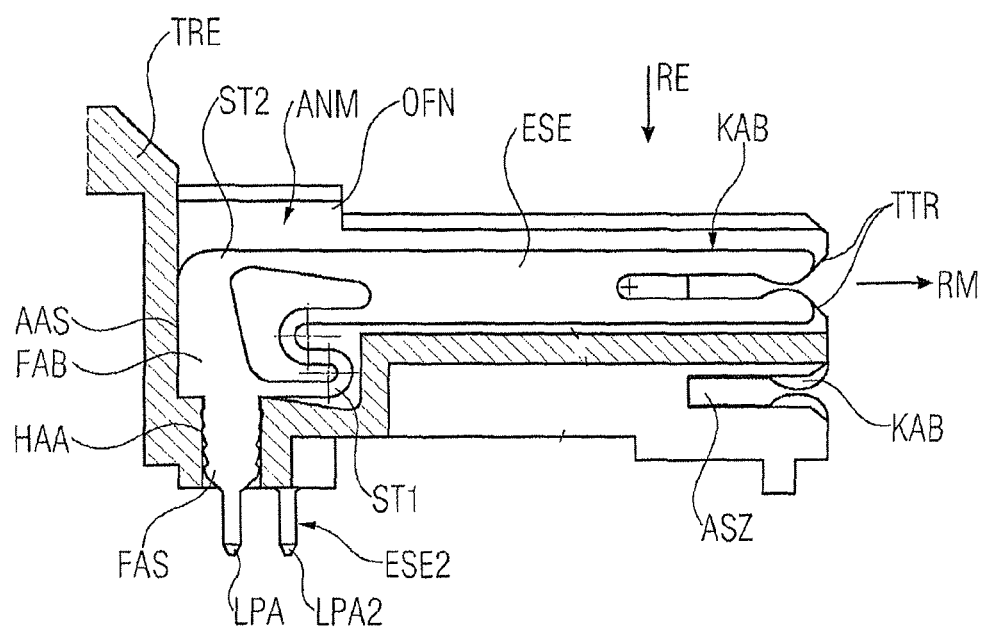
FIG. 3 shows a sectional view through the front part of a carrier element of the plug-in module according to FIGS. 1A-1B along an axis of the carrier element, for illustrating the arrangement of the electrical plug element according to FIGS. 2A-2C in a recess of the carrier element.

In a manner not shown in detail, motor contacts or electrical plug elements ESE are also electrically connected (cf. also FIG. 3) to the printed circuit board LP, at least indirectly. In particular, these electrical plug elements contact the printed circuit board by cohesive bonding or are soldered thereon. As will be explained in more detail below, two electrical plug elements ESE are arranged in a respective recess in the carrier element TRE of the plug and are fixed in the respective recess by an interference fit. As will also be seen in FIG. 3, two exposed contact portions KAB of the electrical plug elements ESE and ESE2 are arranged in the carrier element TRE in such a way that they are arranged offset perpendicular with respect to a mounting direction RM and, in the image plane of FIG. 3, are spaced apart from the top downward. By way of these contact portions KAB, electrical current or electrical output signals of the plug-in module ESM are transmitted to the motor unit ME.

Figure 9:
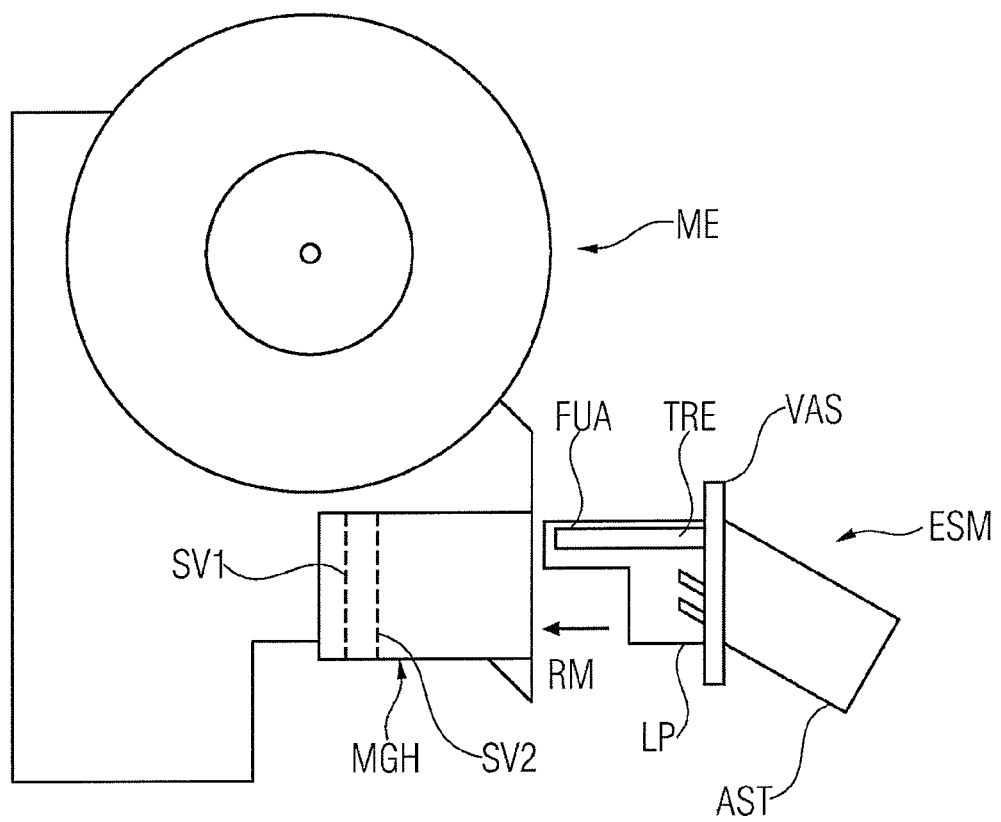
FIG. 9 shows a schematic view of a motor unit as adjusting motor for a window lifter, which adjusting motor is connected to a plug-in module according to the above.

With the insertion of the plug-in module ESM into the motor housing MGH in which the actual electric motor is rigidly mounted, the electrical plug elements ESE, ESE2 meet a corresponding complementary, respective positionally fixed mating contact, indicated in FIG. 9 by the plug connectors SV1 and SV2. In order, despite the measurement tolerances that are inevitable via the movement play between the plug-in module ESM and the motor housing MGH during the insertion process, to achieve an exact position assign between the electrical plug elements ESE, ESE2 and their contact portions KAB and the complementary mating contacts of the motor unit, the electrical plug elements are designed such that they can to a sufficient extent execute positional changes perpendicularly with respect to the mounting direction RM of the plug-in module ESM.

Figure 2A:
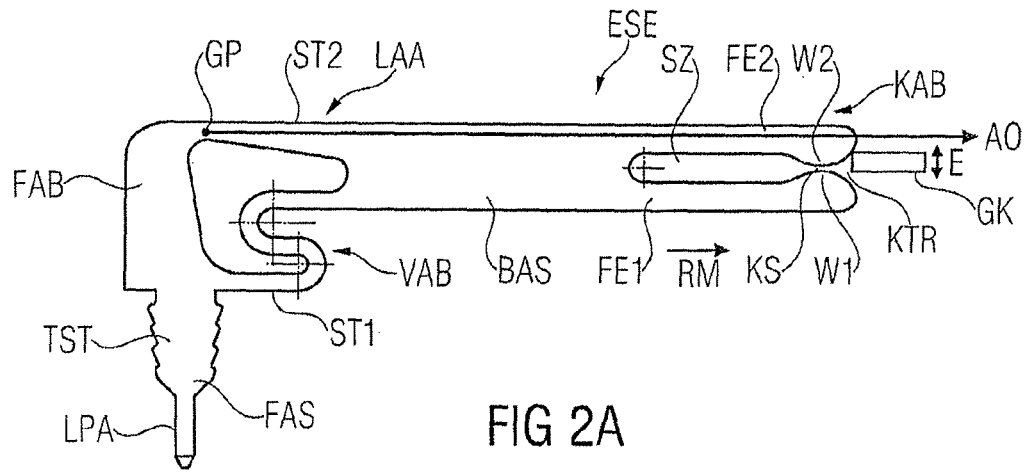
FIGS. 2A-2C show an electrical plug element according to one embodiment of the invention for use, for example, in the plug-in module according to FIGS. 1A-1B.
Figure 2B:
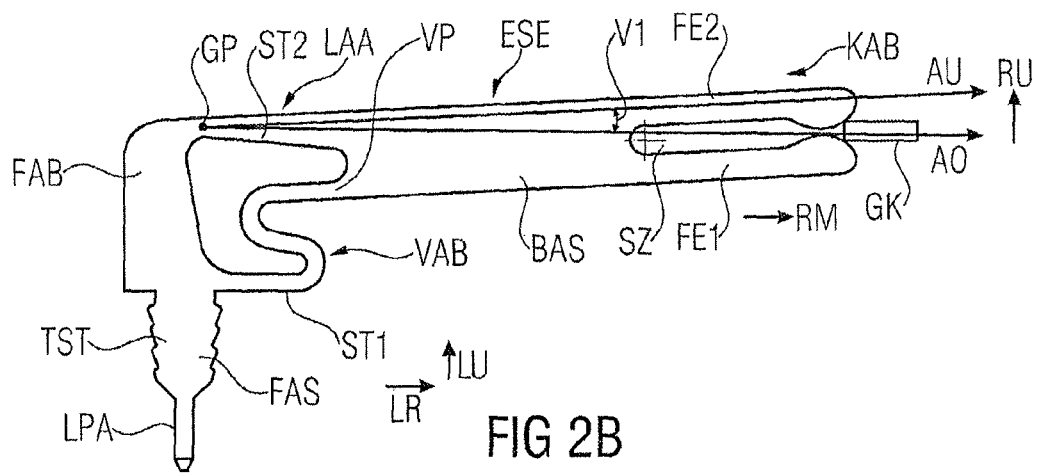
Figure 2C:
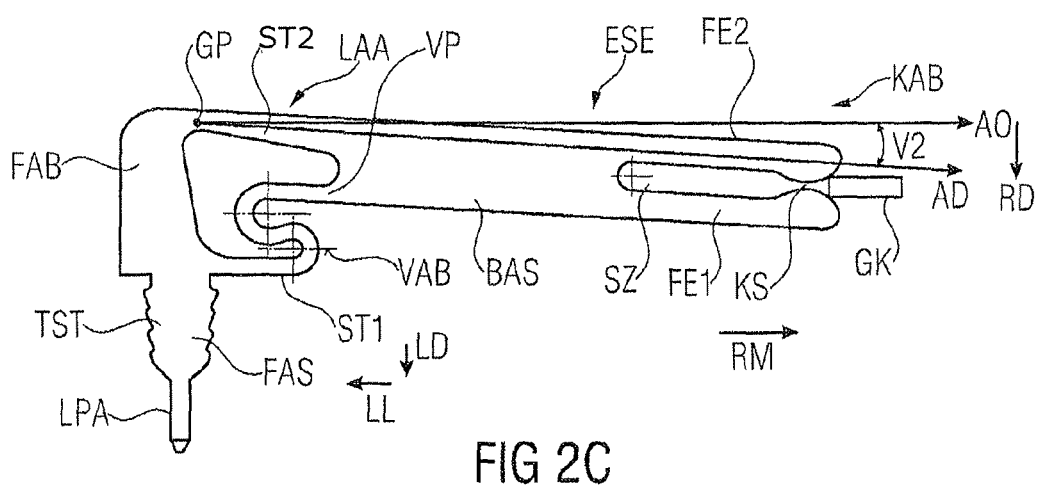

To explain this particular function of an electrical plug element according to one embodiment of the invention, the electrical plug element ESE is shown in detail in FIGS. 2A-2C. This plug element can be designed in particular as a part punched out from sheet metal, for example a copper wrought alloy.

In FIG. 2A, the electrical plug element ESE can be seen in a position in which, in an unloaded state or in a rest position, it is brought into contact with a leaf-like or comb-like mating contact GK. The mating contact GK is intended to provide an electrical contact of the motor unit, for example for one of the plug connector contacts SV1 or SV2 in the housing MGH of the motor unit ME. In FIGS. 2B and 2C, the electrical plug element is shown in a state in which, in order to adapt an incorrect positioning of the mating contact GK, a movement perpendicular to the mounting direction RM is effected, once in a direction upward in the image plane (FIG. 2B) and once in a direction downward in the image plane (FIG. 2C).

The plug element ESE substantially comprises three main components, on the one hand a fixing portion FAS for holding the plug element in the carrier element TRE, a contact portion KAB for engagement with a corresponding plug connector SV1, SV2 of the motor unit, and a positional orientation portion LAA for connecting the fixing portion FAS to the contact portion KAB and for positional orientation of the contact portion during the connection of the electrical plug element to a corresponding (wrongly positioned) mating contact.

The fixing portion FAS will first of all be discussed in more detail. It has a fixing zone or fixing structure TST, which has substantially a Christmas tree structure. During assembly or mounting of the plug-in module, this fixing structure TST, as shown in FIG. 3, is brought into a holding portion HAA of a corresponding recess in the carrier element and, under the action of a force, is pressed together with these. By means of the pressing process, the plastic material of the carrier element flows into the interstices of the projections of the Christmas tree structure TST, such that fixing is thereby provided and a withdrawal of a plug element ESE from a holding portion HAA (in the upward direction in the image plane) is prevented. The fixing structure TST merges (in a downward direction in the image plane) into a contacting portion LPA which serves for electrical contacting with the printed circuit board and by which electrical current or electrical energy can be introduced into the electrical plug element.

In the depiction in FIG. 2, on the right-hand side in each case, the electrical plug element ESE has the contact portion KAB for contacting a mating contact GK or corresponding plug connector of the motor unit. The contact portion KAB comprises a base web BAS, from one end of which a respective spring web FE1 and FE2, directed in mounting direction RM, protrudes. These form between them an (elongate) slit SZ. The initially parallel webs FE1 and FE2 have, in their further course (in the direction of the free end in the view in the direction toward the right), in symmetrical arrangement each an inwardly directed bead W1 and W2. A narrow contact point KS is formed between these beads. The clear distance between the beads W1 and W2 in the area of the contact point KS is smaller than the extent E of the mating contact GK perpendicular to the mounting direction. In this way, the spring webs FE1 and FE2 spring slightly back (move in a direction perpendicular to the mounting direction away from the mating contact GK) when the mating contact GK passes the contact point KS.

To more easily bring the mating contact GK to the contact point KS, the distance between the two spring webs FE1 and FE2 increases from the contact point KS to their free ends again (from left to right in the image plane), such that a contact funnel KTR is formed here.

If, as is shown in FIG. 2A, the mating contact GK now runs eccentrically onto the contact point KS, the mating contact eccentrically meets the contact funnel KTR. In order to permit a reliable engagement of the mating contact with the contact point and to prevent damage to the two components, the electrical plug element ESE now has the positional orientation portion LAA. The latter firstly has a foot portion FAB, which is connected to the fixing portion FAS. In a direction parallel to the mounting direction RM (perpendicular to the orientation of the fixing portion), two webs ST1 and ST2 protrude from the foot portion FAB and connect the fixing portion FAS to the contact portion KAB, of which at least one of the webs, here the web ST1, has a deformable portion VAB. This deformable portion finally serves to permit a movement of the contact portion KAB in a direction RU or RD, as is shown in FIGS. 2B and 2C, perpendicular to the mounting direction. More precisely, the movement or the pivoting of the contact portion KAB is permitted by the fact that, on the one hand, the second web ST2 has a portion between the foot portion FAB and the base web BAS in which its cross section assumes a minimum. This portion serves as a hinge portion or hinge point GP for obtaining a pivoting of the contact portion KAB about the hinge point GP. By contrast, the first web ST1 is designed in such a way that it has an area which is extensible or compressible in terms of its length or its dimensions. In particular, it is advantageous if the deformable portion VAB can modify its extent in a direction parallel and perpendicular to the mounting direction, in order to follow the pivoting movement of the contact portion about the hinge point GP. According to the view in FIGS. 2A-2C, this is achieved by a modifiable portion VAB that has a meandering shape, here in particular an S shape.

Proceeding from the example shown in FIG. 2A, in which the mating contact GK eccentrically meets the funnel-shaped portion KTR, it is now necessary that the contact portion KAB, in order to achieve a safe engagement, is pivotable in a direction RU (an image upward) such that the mating contact GK can meet the contact point, and a contacting of the mating contact by both spring webs FE1 and FE2 for a good current-carrying capacity is permitted. By means of the design of the modifiable portion VAB in an S shape, a pivoting of the contact portion VAB in the direction RU has the effect that the S-shaped portion is stretched apart (the curvature of the bulging portions of the "S" is reduced), such that a connection point VP of the first web ST1 with the base web BAS, on account of the pivoting about the hinge point GP, experiences a movement to the right in the direction of the arrow LR and upward in the direction of the arrow LU (i.e. along the mounting direction RM and perpendicular thereto).

Assuming that the pivoting of the contact portion KAB takes place about the hinge point GP, in the example shown in FIG. 2B an axis AO corresponding to a rest state or unloaded state of the electrical plug element ESE is offset or pivoted counterclockwise by an angle V1, such that the plug element ESE, after pivoting in the direction of the arrow RU, has a first displaced axis AU which, as has been stated, is turned through the angle V1 from the unloaded axis AO.

Reference is now made to FIG. 2C in which a case is again shown which is intended to illustrate an engagement of an eccentrically positioned mating contact GK with the contact point KS. Here, in a starting state analogous to FIG. 2A, the mating contact GK would not meet the upper spring web but instead the lower spring web FE1 (eccentrically). In order now to permit an engagement with the contact point, it is possible during the mounting procedure, i.e. during the movement of the electrical plug element ESE in mounting direction RM, for the contact portion KAB to move along the arrow RD perpendicular to the mounting direction, so as to permit a positional orientation and therefore a reliable engagement. For this purpose, the contact portion KAB is again pivoted about the hinge point GP, as a result of which the modifiable VAB is compressed. More precisely, the connection point VP now moves downward in a direction of the arrow LD and to the left in a direction of the arrow LL toward the foot portion FAB. In this way, the curvature of the bulging portions of the S shape is increased.

Assuming that the pivoting of the contact portion KAB takes place about the hinge point GP, in the example shown in FIG. 2C the axis AO corresponding to the rest state or unloaded state of the electrical plug element ESE is offset or pivoted clockwise by an angle V2, such that the plug element ESE, after pivoting in the direction of the arrow RD, has a first displaced axis AD which, as has been stated, is turned through the angle V2 from the unloaded axis AO.

In this way, a pivoting of the contact portion KAB about the hinge point GP of the first web can be permitted by the special design of the deformable portion VAB. In particular, the provision of two webs ST1 and ST2 for connecting the fixing portion to the contact portion ensures a high current-carrying capacity of the electrical plug element and permits a positional compensation of the contact portion in the event of alignment errors. Reference is now made to FIG. 3 in which a sectional view of the front or free end of the carrier element TRE is shown in order to illustrate the reception of an electrical plug element ESE in the carrier element. The carrier element TRE has a respective recess both for the electrical plug element ESE and also for the electrical plug element ESE2. This recess AMM (shown only for the electrical plug element ESE in the example, but applicable analogously to ESE2) has an opening OFN through which a respective electrical plug element ESE is insertable into the recess. In the example of the plug element ESE, the opening is oriented upward in the image, such that the electrical plug connector ESE, during the mounting procedure, is applied in the downward direction along the arrow RE in such a way that the fixing portion FAS of the electrical plug element engages in the holding portion HAA of the carrier element. As has already been mentioned, the electrical plug connector is then pressed in the holding portion HAA by means of the Christmas tree structure TST.

As can be seen in FIG. 3, the opening OFN is oriented in such a way that the electrical plug element ESE (also ESE2) is to be inserted into the corresponding recess ANM perpendicularly with respect to the mounting direction. In connection with this, it is possible that the foot portion FAB of the electrical plug element ESE bears on an inner wall or on a bearing portion AAS of the recess ANM. This direct contact to the inner wall, extending perpendicularly with respect to the mounting direction, stabilizes the electrical plug element ESE when it meets the respective corresponding plug connectors during the fitting of the plug-in module ESM into the motor housing MGH. Particularly in the case of an incorrect positioning of the plug connectors SV1 or SV2, the electrical plug element ESE is supported by the bearing portion AAS.

To further improve the stability, the recess ANM is oriented in the carrier element in such a way that the electrical plug element ESE in the inserted state is oriented in the mounting direction. Moreover, the distance between the inner walls of the recess ANM which extend parallel to the image plane corresponds, in the area of the contact portion substantially to the width of the electrical plug element, such that the electrical plug element is guided by the inner walls of the recess. As is shown in particular for the recess of the second electrical plug element ESE2, a respective recess ANM of the carrier element moreover comprises an elongate slit ASZ which substantially corresponds to the slit SZ between the spring webs FE1 and FE2 of the contact portion. This slit ASZ has the effect that a comb-like mating contact GK, as shown in FIG. 2A for example, can come into correct engagement with the contact point KS. For positional orientation of the carrier element with respect to a mating contact GK, a respective slit ASZ also of the recess ANM advantageously has, at its free end, a recess-side funnel portion TTR in order to guide the mating contact from the carrier element in the direction of the contact point.

It will also be noted that the corresponding receiver for the second plug element ESE2 is designed in such a way that its opening likewise perpendicular to the mounting direction RM and in an opposite direction to the opening OFN.

Figure 4:
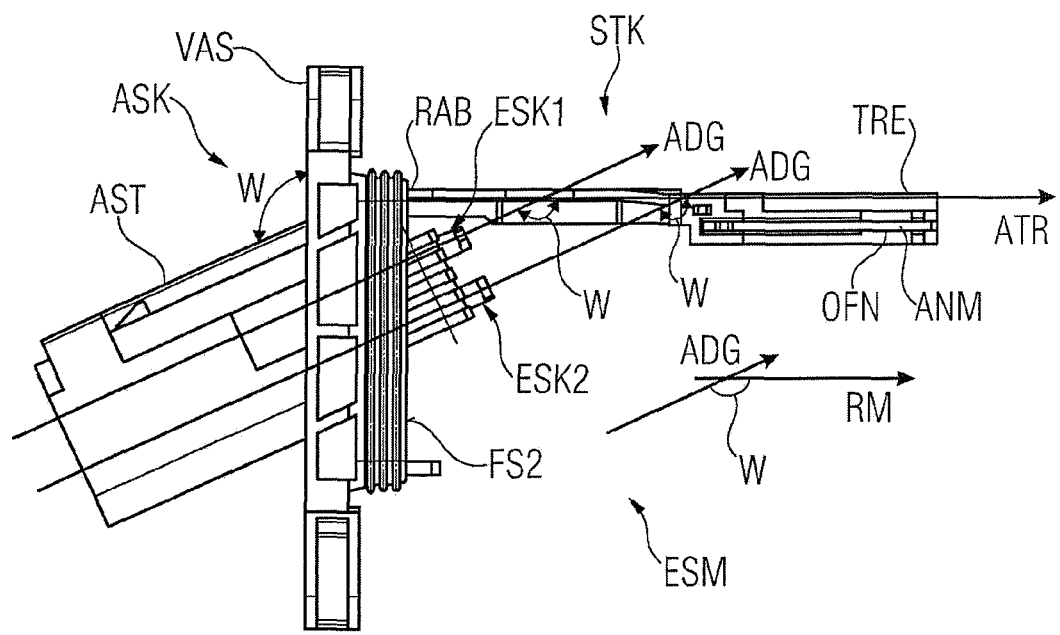
FIG. 4 shows a bottom plan view of the plug-in module according to FIGS. 1A-1B.

Reference is now made to FIG. 4 which shows a bottom view of the plug-in module according to the embodiment of the invention as described above. The geometric relationships between plug and attachment body will now be considered in more detail with reference to this figure. As was already apparent from the preceding figures, the plug-in module ESM has a plug STK for insertion into a housing MGH of the motor unit along the mounting direction RM. The plug has the carrier element TRE with an axis ATR parallel to the mounting direction RM. In the carrier element, a recess ANM can be seen into which an electrical plug element is insertable via the opening OFN and can be pressed in the recess ANM, as is shown in FIG. 3. As can be seen from the middle of FIG. 4, the carrier element TRE protrudes at a right angle at or from an edge portion RAB of the second surface FS2 of the connection portion VAS. Furthermore, the attachment piece AST of the attachment body ASK protrudes at an angle W from the connection portion VAS. This arrangement of the attachment piece AST at an angle to the connection portion VAS has the effect that the through-recesses DGA or the axes ADG of the through-recesses that pass therethrough are not oriented parallel to the mounting direction RM. Instead, the axes of the respective through-recesses likewise have the predetermined angle W with respect to the mounting direction RM, which angle is smaller than 180°.

As can also be seen in FIG. 4, the carrier element TRE is arranged on the edge portion RAB of the second surface FS2 in such a way that the outlet openings of the through-recesses on the second surface FS2 are facing toward the carrier element TRE or the inner face of the latter. To put it another way, the carrier element TRE is arranged on the second side face in such a way that an imaginary continuation of each through-recess intersects the axis ATR of the carrier element TRE. As can be seen from FIG. 4, the axes ADG of the through-recesses also intersect the axis ATR of the carrier element at the angle W.

Figure 5:
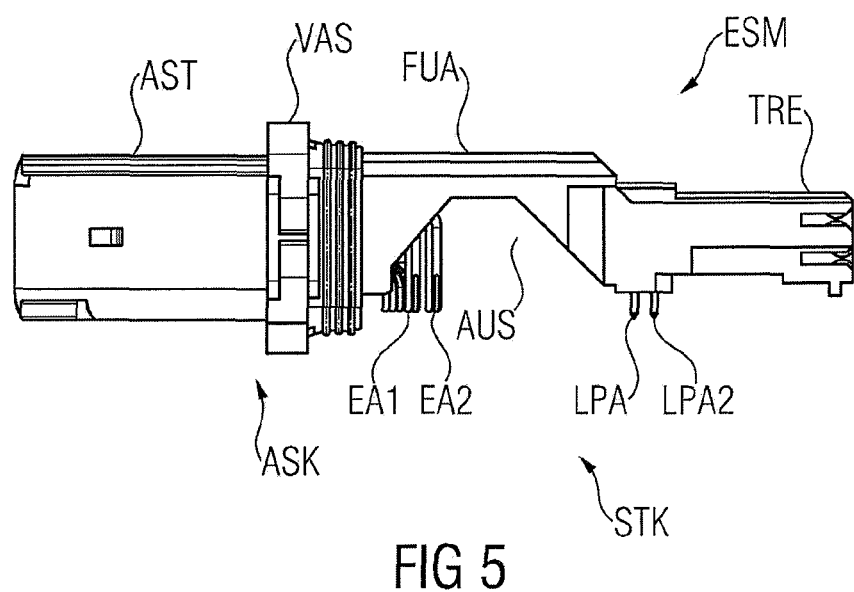
FIG. 5 shows a side view of the plug-in module according to FIGS. 1A-1B.

FIG. 5 now shows a view of the plug-in module ESM from the side, in particular from a viewing direction looking at the outer face of the carrier element TRE, i.e. the second surface FS2 or the side of the carrier element opposite the outlet openings of the through-recesses. As can be seen in FIG. 5, the carrier element has a recess AUS between the portion for receiving the plug elements (the exposed portion of the carrier element) and the portion connected to the connection portion VAS. As will be explained in the following figures, this recess serves in particular for the insertion or mounting of the contact pins ESK1, ESK2 and further contact pins in the attachment body ASK.

To explain the mounting of the electrical contact pins in the attachment body ASK, reference is now made to FIG. 6 in which a view of the plug-in module ESM from below is again shown. Reference is made at the same time to FIG. 7, which shows a section parallel to the image plane of the plug-in module shown in FIG. 6, in order to illustrate the geometric relationships within the attachment body ASK.

After the plug and the attachment body have been produced as an integral component by injection molding and the contact pins have accordingly also been produced preferably as parts punched out from sheet metal, these components have to be brought together. In the injection molding, a multiplicity of through-recesses DGA have been created in the attachment body ASK and extend from a first side face FS1 to an opposite second side face or surface FS2 of the attachment body, in order to receive electrical contact pins therein. During the assembly of the plug-in module ESM, the electrical contact pins ESK1 and ESK2 (and any further electrical contact pins) are brought together in such a way that the second end portions EA12 and EA22 of the electrical contact pins are inserted into the respective inlet openings of the respective through-recesses on the first side face FS1. The respective contact pins are then moved or pushed along the axis ADG of the through-recesses DGA or along the insertion directions RE1 and RE2 (from left to right in the image). More precisely, the electrical contact pins ESK1, ESK2 are pressed into the attachment body ASK in such a way that a respective Christmas tree structure KST1 and KST2 of the electrical contact pins is pressed into a respective through-recess, such that this portion of the through-recess is widened in its dimensions and begins to flow. In this way, the electrical contact pins are held by the material of the attachment body that has flowed between the continuations of the Christmas tree structure. Furthermore, a projection V1, V2 is formed on a respective electrical contact pin ESK1 and ESK2 and, after coming into contact with a corresponding shoulder S1, S2 of the attachment body, prevents a further movement of the contact pin in a direction RE1, RE2. In this way, a precise positioning of the electrical contact pins can be ensured.

Figure 6:
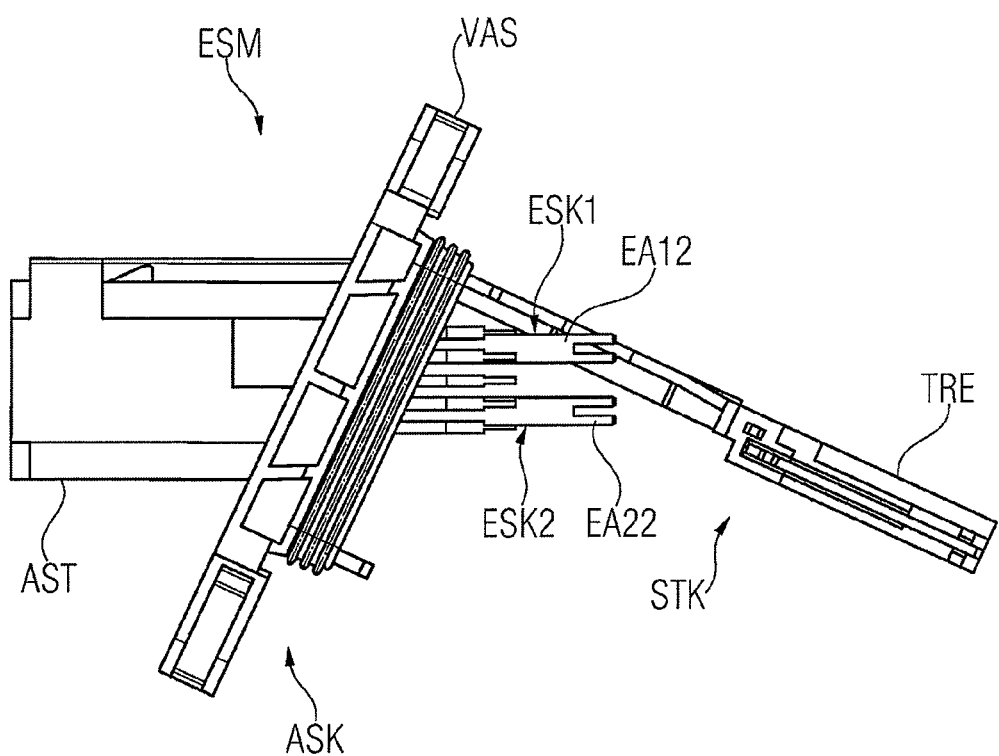
FIG. 6 shows a bottom view of the plug-in module from FIGS. 1A-1B, depicting an intermediate assembly state in which the contact pins have not yet been worked.
Figure 7:
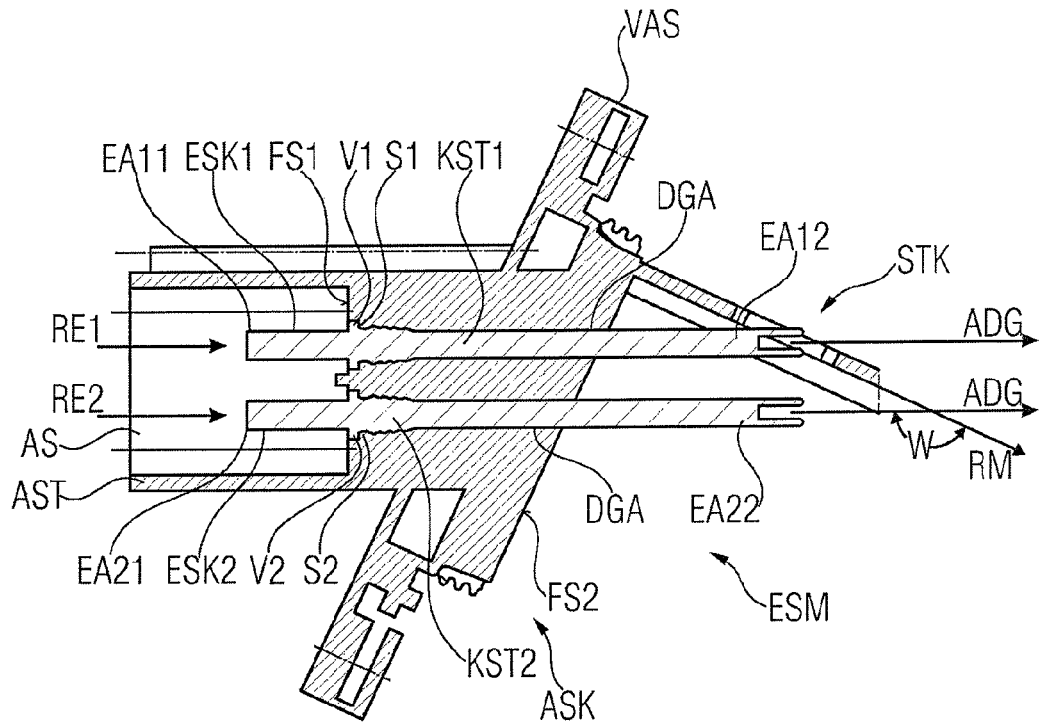
FIG. 7 shows a sectional view through the plug-in module shown in FIG. 6, in a plane parallel to the image plane of FIG. 6, in order to illustrate the arrangement of the contact pins in an attachment body.

As can be seen on the right-hand side of FIG. 6 or 7, the angled arrangement of the attachment piece AST with respect to the connection portion VAS has the effect that at least the second end portion EA12 of the first electrical contact pin ESK1 would, on account of its elongate structure (which is necessary for passage through the through-recesses during the assembly), abut against the carrier element TRE. However, as has already been mentioned with reference to FIG. 5, the carrier element has a recess AUS which is dimensioned in such a way that electrical contact pins, of which the ends protrude from the second side face FS2, can pass through the carrier element and do not abut against this. By virtue of the provision of the recess AUS in the carrier element and a corresponding measurement, it is also possible that a tool for subsequent working of the respective second end portion of an electrical contact element can penetrate from the outside through the carrier element to the second end portions, in order to work the latter. In a following work step, the second portions EA12 and EA22 (and possibly any further end portions) are then also worked in such a way that they are bent downward perpendicularly with respect to their outlet direction, as can be seen in FIG. 5. Thus, it is then possible that a printed circuit board applied to the plug-in module from underneath (cf. FIG. 5 and FIG. 8) can be connected on the one hand to the second end portions EA1, EA2 and further of the electrical contact pins, and also to the attachments LPA and LPA2 of electrical plug elements ESE and ESE2, respectively.

If the printed circuit board was now brought to the plug STK and connected to corresponding electrical attachments of the contact pins or of the electrical plug elements, this gives rise to a functional plug-in module ESM, as shown in FIG. 8. The plug STK now has both a carrier element and also, connected thereto, a printed circuit board LP to which, on the one hand, the electrical contact pins and also the electrical plug elements are connected, and which moreover carries electronic components EBS, for example a relay RL, etc.

As can be seen in FIG. 9, a functional plug-in module ESM of this kind can now be inserted into a housing MGH of a motor unit ME along a mounting direction RM. Electrical plug elements ESE provided on the carrier element TRE can then be brought into engagement with the corresponding mating contacts or plug connectors SV1, SV2 of the motor unit ME in order to feed electrical current or electrical energy to the motor unit ME via the plug-in module ESM. To facilitate the insertion of the plug-in module into the housing MGH or to improve the orientation of the carrier element and of the electrical plug elements held therein, the carrier element has a guide portion FUA (cf. also FIG. 1). In order also to permit a tolerance compensation between the electrical plug elements and the corresponding mating contacts SV1 and SV2, the carrier element or the electrical plug contacts has the measures described in the preceding figures, such that a loss of function of the plug-in module ESM, caused by non-aligned introduction of the electrical plug elements or motor contacts with their mating contacts in the motor housing by damage of the electrical plug elements, is avoided.

The invention claimed is:

1. A plug-in module for a motor unit comprising:
   a plug which can be inserted into a housing of the motor unit along a mounting direction;
   the plug comprising a carrier element with:
      at least one recess defined in part by a lower surface and sidewalls extending from the lower surface,
      and a respective electrical plug element for engagement with a corresponding plug connector of the motor unit for electrical contacting, which is arranged in the at least one recess, the respective electrical plug element including a fixing zone, the fixing zone comprising a fixing portion extending in a first direction from the respective electrical plug element and a contacting portion extending in the first direction from the fixing portion, the contacting portion having a diameter smaller than a diameter of the fixing portion;
   the at least one recess comprises:
      an opening above the lower surface through which the respective electrical plug element can be introduced into the recess, and
      a holding portion below the lower surface into which the fixing portion of the respective electrical plug element can be pressed such that the fixing portion extends below the lower surface and the holding portion surrounds and contacts the fixing portion.

2. The plug-in module as claimed in claim 1, in which the opening of the at least one recess is oriented in a direction perpendicular to the mounting direction, such that the respective electrical plug element can be inserted into the corresponding recess in a manner perpendicular to the mounting direction.

3. The plug-in module as claimed in claim 1, wherein the motor unit is an adjusting motor for use in a motor vehicle.

4. The plug-in module as claimed in claim 1, wherein the fixing portion has a Christmas tree structure.

5. The plug-in module as claimed in claim 1, in which the electrical plug element has a contact portion for engagement with the corresponding plug connector of the motor unit, which is movable in a direction perpendicular to the mounting direction, in order to permit a positional orientation with respect to the plug connector.

6. The plug-in module as claimed in claim 5, in which the contact portion is received at least partially in the recess in such a way that the movement of the contact portion for the positional orientation is guided by inner walls of the recess.

7. The plug-in module as claimed in claim 6, in which the distance between the inner walls of the recess in the area of the contact portion corresponds substantially to the width of the electrical plug element in the area of the contact portion.

8. The plug-in module as claimed in claim 5, in which the contact portion has, at the ends, two opposite spring webs which are separated from each other by a slit, so as to engage with a corresponding comb-like plug connector of the motor unit,
   wherein the recess surrounds the contact portion in such a way that the recess, in the area of the slit, has at least one corresponding recess-side slit, which allows the comb-like plug connector to engage in the mounting direction with the slit of the contact portion.

9. The plug-in module as claimed in claim 8, in which the at least one recess-side slit has, at a free end, a funnel-shaped portion for guiding the comb-like plug connector of the motor unit.

10. The plug-in module as claimed in claim 1, in which the carrier element has a guide portion for guiding the plug during the insertion of the plug into the housing of the motor unit.

11. The plug-in module as claimed in claim 10, in which the opening of the least one recess is oriented in a direction perpendicular to the mounting direction, such that the respective electrical plug element can be inserted into the corresponding recess in a manner perpendicular to the mounting direction.

12. A method for producing a plug-in module for a motor unit, the method comprising:
   using plastic to cast a plug housing for insertion into a housing of a motor unit, wherein the plug housing has a carrier element with at least one recess defined in part by a lower surface and sidewalls extending from the lower surface for engagement with a corresponding plug connector of the motor unit, wherein the at least one recess comprises (i) an opening above the lower surface through which a respective electrical plug element can be introduced into the recess, and (ii) a holding portion below the lower surface into which a fixing portion of the respective electrical plug element can be pressed such that the fixing portion extends below the lower surface and the holding portion surrounds and contacts the fixing portion; and pressing the respective electrical plug element into the holding portion of the at least one recess, the respective electrical plug element including a fixing zone, the fixing zone comprising the fixing portion extending in a first direction from the respective electrical plug element and a contacting portion extending in the first direction from the fixing portion, the contacting portion having a diameter smaller than a diameter of the fixing portion.

13. The method as claimed in claim 12, wherein the motor unit is an adjusting motor for use in a motor vehicle.

14. The method as claimed in claim 12, wherein the fixing portion has a Christmas tree structure.

\* \* \* \* \*